March 13, 1928. 1,662,139

J. W. WHITLOW

INCUBATOR

Filed June 27, 1925 2 Sheets-Sheet 1

Inventor
J. W. Whitlow

By C. A. Snow & Co.
Attorneys

March 13, 1928. 1,662,139
J. W. WHITLOW
INCUBATOR
Filed June 27, 1925 2 Sheets-Sheet 2
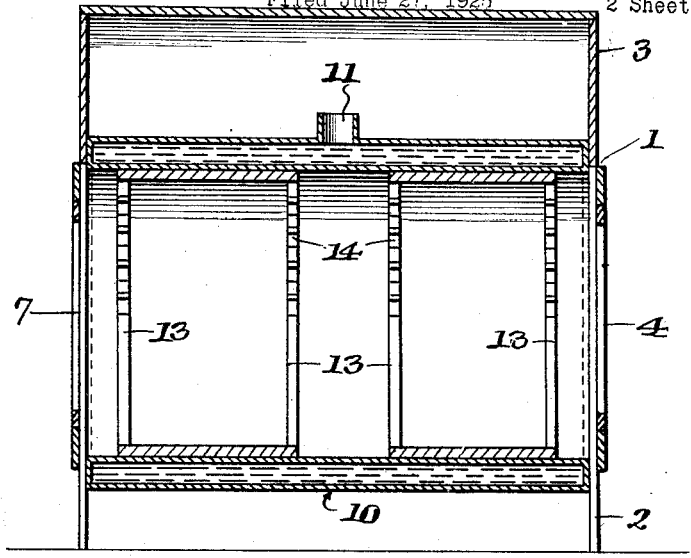
Fig. 3.
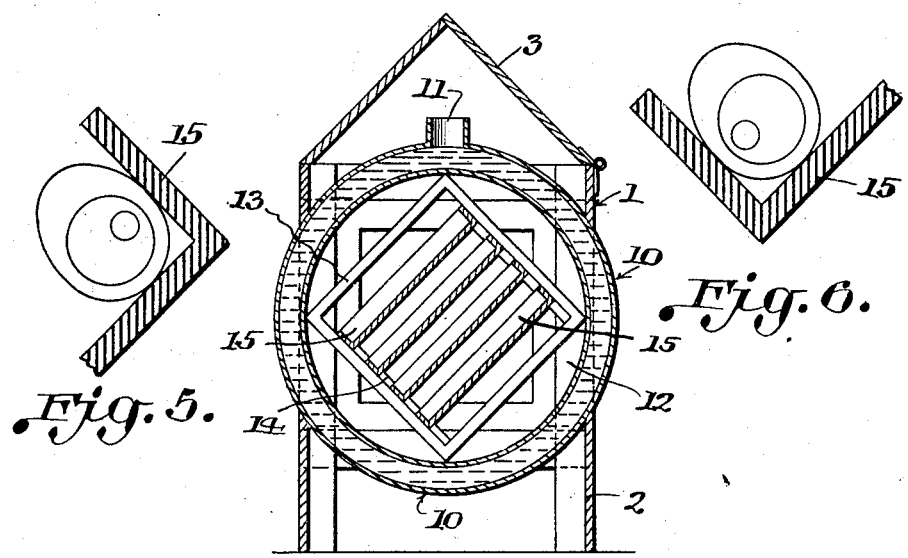
Fig. 5. Fig. 6.
Fig. 4.
Inventor
J. W. Whitlow
By C A Snow & Co
Attorneys Patented Mar. 13, 1928.

1,662,139

UNITED STATES PATENT OFFICE.

JIDY W. WHITLOW, OF COMANCHE, OKLAHOMA.

INCUBATOR.

Application filed June 27, 1925. Serial No. 40,035.

This invention relates to the poultry industry and more particularly to incubators.

The object of the invention is to provide an incubator which is simple and compact in construction and which carries a large volume of water for supplying the necessary heat so that in case the lamp should go out the water will retain its heat and avoid chilling of the eggs before the operator discovers that the lamp is out.

Another object of the invention is to provide an incubator having an egg supporting frame so constructed that the trays will be placed at an angle of 45° more or less so that when the trays are removed and returned end for end the eggs will be turned by this procedure.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 3 is a longitudinal section taken on the line 3—3 of Figure 2;

Figure 4 is a transverse section;

Figure 5 is a detail sectional view of one of the egg trays shown in one position; and Figure 6 is a similar view with the tray shown in the reversed position, each tray having an egg illustrated therein.

Figure 1:
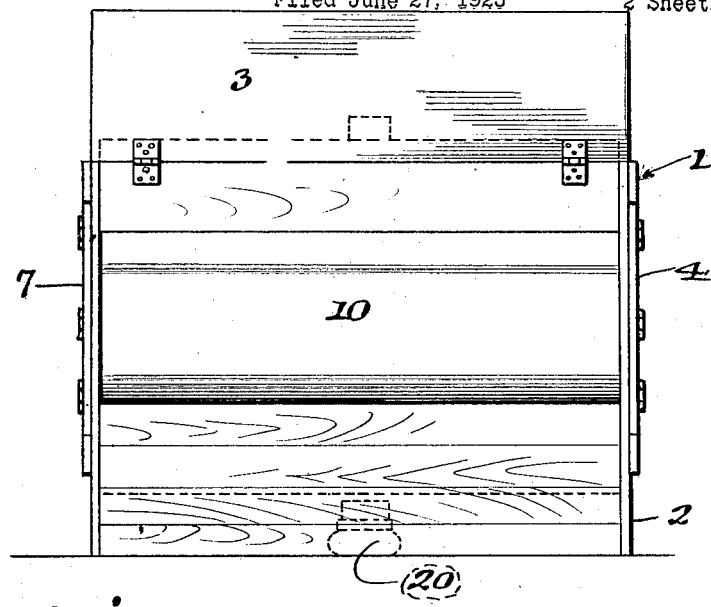
Figure 1 represents a side elevation of an incubator constructed in accordance with this invention.
Figure 2:
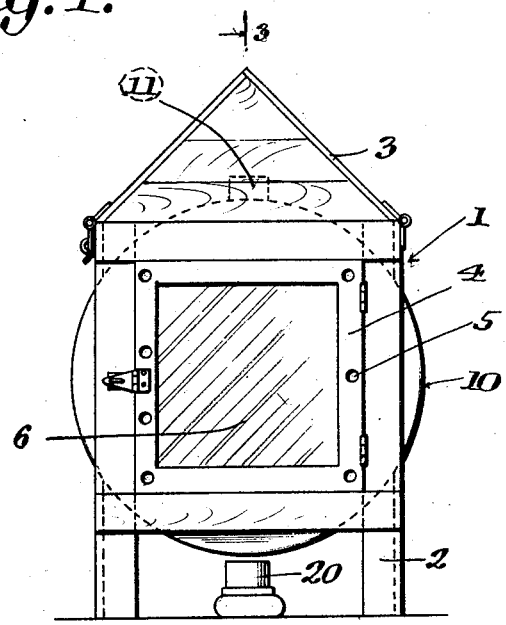
Figure 2 is a front elevation thereof.

In the embodiment illustrated a supporting frame 1 is shown which may be of any suitable construction and is here shown equipped with legs 2 whereby the water chamber 10 mounted in the frame is disposed above the floor a sufficient distance to permit the lamp 20 which is used for heating the water to be arranged below said container as is shown clearly in Figures 1 and 2.

The water jacket container 10 which surrounds the tray supporting frame is made in the form of a double walled barrel or cylinder, the walls of which are spaced apart a sufficient distance to hold water enough to retain its heat a considerable length of time even after the lamp 20 has gone out or been extinguished. This water jacket 10 is shown provided in its upper end with a steam vent 11 and a dome-shaped hinged hood 3 covers the upper portion of the jacket as is shown clearly in Figures 1 and 4.

A door 4 closes the front end of the incubator chamber and is provided with a plurality of air inlets 5 to provide the necessary air for the eggs. This door 4 preferably has a glass panel 6 to permit observation of the interior of the incubator chamber.

A similar closure 7 is shown at the rear of the incubator chamber so that access to said chamber may be had from either end.

Mounted in the cylindrical incubator chamber 12 is a tray supporting frame 13, the side walls of which are provided with spaced cleats 14 to form guides and supports for the egg trays 15, any desired number of which may be employed according to the size of the incubator, four being here shown spaced apart a sufficient distance to permit the free circulation of air between them.

The frame 13 is mounted as shown in Fig. 4 so that the trays when inserted therein will be held at an angle of 45°, more or less. This arrangement of the trays provides for the turning of the eggs when they are removed and reversed end for end. It is of course known that the trays must be removed to air and cool the eggs once or twice a day at least and when they are returned end for end this operates to turn the eggs without necessitating handling of the individual eggs.

In Figure 3 two of the tray supporting frames 13 are shown.

The arrangement of the tray supporting frame 13 as shown in the drawings and the formation of the water jacket or container 10 as a cylinder provides for the uniform supply of heat from the water to all of the eggs and thus ensures proper incubation of the eggs and a good hatch.

I claim:—

An incubator including a supporting structure, a substantially tubular water chamber mounted within the supporting structure, a rectangular supporting frame within the water chamber, the side walls of the rectangular frame being arranged at oblique angles with respect to the supporting structure, a plurality of trays arranged within the rectangular supporting frame and arranged one above the other, said trays being removably supported to permit the trays to be removed and reversed to change the position of the eggs and trays.

In testimony that I claim the foregoing as my own, I have hereto affixed my signature.

JIDY W. WHITLOW.